Figure 1:
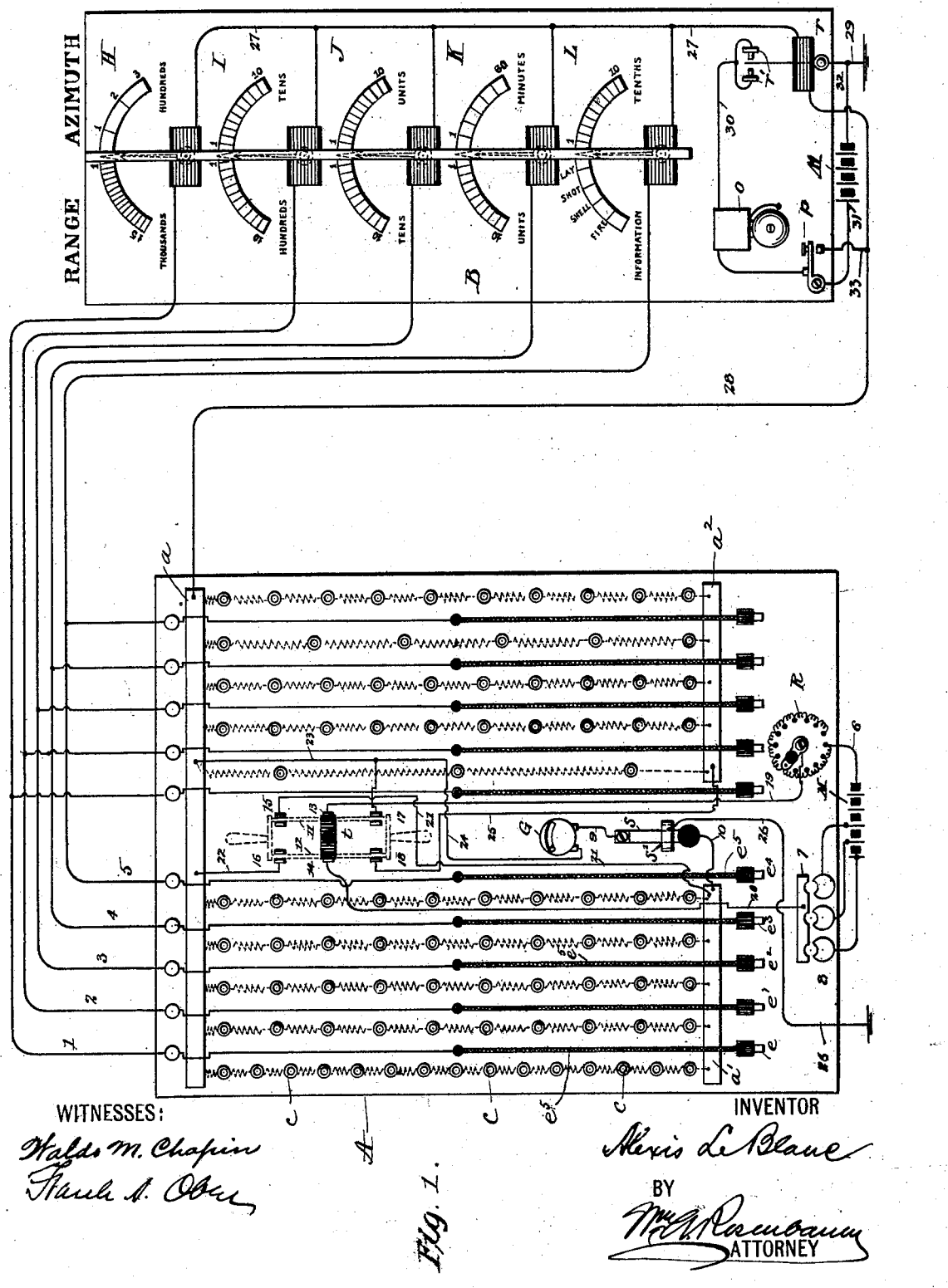

No. 691,742. Patented Jan. 28, 1902.
A. LE BLANC.
RANGE INDICATOR.
(Application filed May 4, 1901.)

(No Model.) 2 Sheets—Sheet 1.

No. 691,742.
A. LE BLANC.
RANGE INDICATOR.
(Application filed May 4, 1901.)
Patented Jan. 28, 1902.
(No Model.)
2 Sheets—Sheet 2.
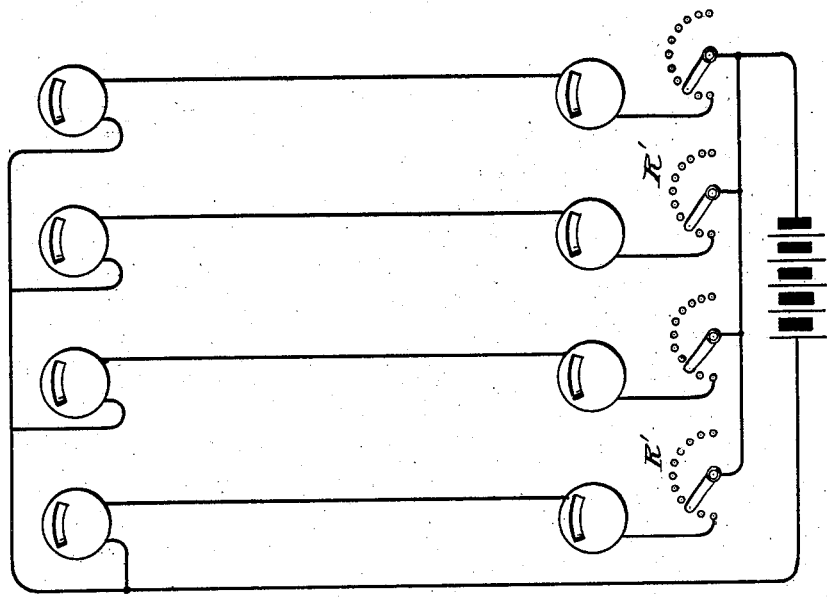
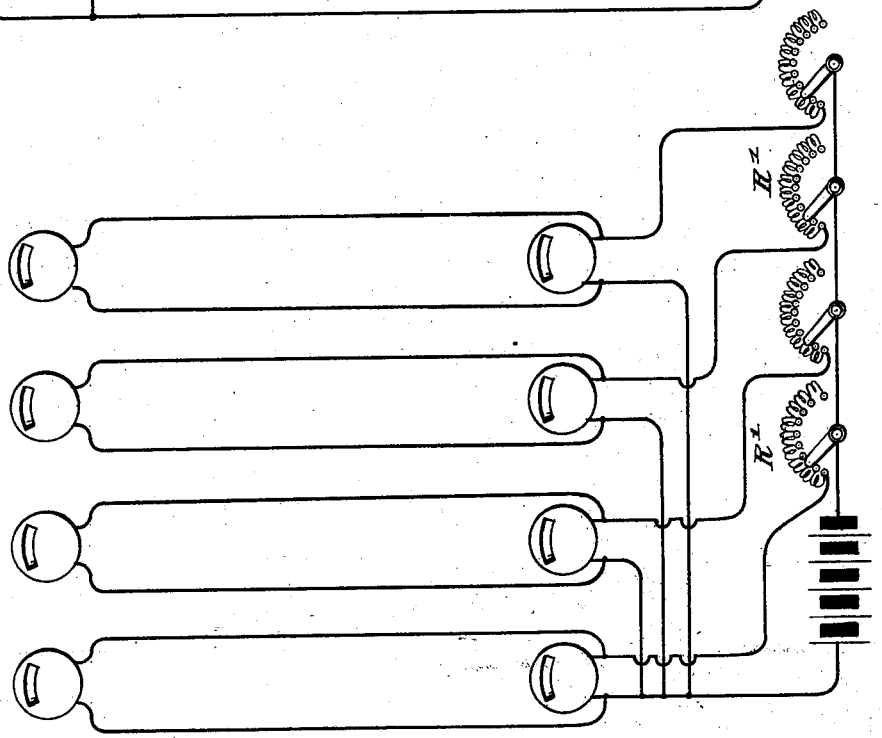
WITNESSES:
INVENTOR
Alexis Le Blanc
BY
ATTORNEY

UNITED STATES PATENT OFFICE.

ALEXIS LE BLANC, OF NEW YORK, N. Y.

RANGE-INDICATOR.

SPECIFICATION forming part of Letters Patent No. 691,742, dated January 28, 1902.

Application filed May 4, 1901. Serial No. 58,751. (No model.)

*To all whom it may concern:*

Be it known that I, ALEXIS LE BLANC, a citizen of the United States, residing at the city of New York, in the borough of Richmond and State of New York, have invented certain new and useful Improvements in Range-Indicators, of which the following is a full, clear, and exact description.

This invention relates to range-indicators intended to transmit the range and other information from the location of the range-finder to the location of the guns, the object being to provide an apparatus which will be certain in its operation and easily and quickly manipulated.

In carrying out my invention I vary the difference of potential across the terminal of a plurality of electric circuits containing galvanometers in proportion to the indication which each circuit is to give, and the readings are taken directly from the dials or scales of the receiving instruments.

The invention will be described in detail with reference to the accompanying drawings, in which—

Figure 1 represents, diagrammatically, my complete system, including the transmitting and receiving apparatus. Figs. 2 and 3 illustrate simplified forms of apparatus for carrying out my invention.

The transmitting board or station is indicated by A and the receiving board or station by B. To the face of the board A is fixed a metallic strip $a$ near the top, and near the bottom are two parallel metallic strips $a'$ and $a^2$, respectively. Between the strips $a'$ and $a$ are arranged five resistance-wires, one of which is divided into fifteen parts by plug-holes $c$ and indicates "thousands." The next three are divided into ten parts by plug-holes and indicate, respectively, "hundreds," "tens," and "units." The fifth resistance is likewise divided up, but is used for sending other information than numbers or quantities. Each row of resistances has a corresponding plug, (indicated by $e$, $e'$, $e^2$, $e^3$, and $e^4$, respectively.) These plugs are at the ends of flexible cords $e^5$, which are attached to the face of the board and form the terminals of circuit-wires 1, 2, 3, 4, and 5, leading to the receiving-station. Between the strip $a^2$ and the strip $a$ is another set of five resistances, also divided up by plug-holes, as shown, and fitted with flexible cords and plugs in the same manner as before described, and are also connected with the circuit-wires 1, 2, 3, 4, and 5 for the purpose of giving a different kind of information at the receiving-station when desired.

M is a battery, one terminal of which is connected by wire 6 with a rheostat R, while the other terminal is adapted to be connected with a metallic strip 7 by means of a plug inserted between said strip and any one of a number of contacts 8 in order to cut in more or less of the battery, as will be obvious.

G is a galvanometer, one terminal of which connects through wire 9 with the spring-levers of a switch or key. This lever normally stands against its back-stops $s'$, but when depressed leaves the back-stop and makes connection with a contact from which leads the wire 10.

$t$ is a double-pole switch consisting of two blades 11 and 12, pivoted at the terminals 13 and 14 and connected together by a cross-piece of insulating material, to which the handle is attached. This switch is adapted to engage with contacts 15 and 16 or 17 and 18 and normally stands between the two in the position shown in full lines. The terminal 13 is connected with the arm of the rheostat R by wire 19. The terminal 14 is connected with the strip 7 by wire 20. The contact 15 is connected with the strip $a'$ by wire 21. The contact 16 is connected with strip $a$ by wire 22. Contact 17 is connected with strip $a$ by wire 23 and with the galvanometer by wire 24. Contact 18 is connected with the strip $a^2$ by wire 25. The back-stop of the switch is grounded by wire 26.

Referring now to the receiving-board, it will be seen to contain five galvanometers H, I, J, K, and L. These are of the same character and calibrated in the same manner as the galvanometer G at the transmitting-board. Their pointers are, however, normally located at the middle of the scale and are adapted to swing in either direction, depending on the polarity of the current flowing through their respective coils. The instrument H is in the circuit of wire 1, I is in the circuit of wire 2, J is in the circuit of wire 3, K is in the circuit of wire 4, and L is in the circuit of wire 5. All of said wires after passing through the instruments connect with a common lead-wire 27. The instrument H, which corresponds to the first resistance in each set of resistances at the transmitting-board, has its scale divided on one side into fifteen parts, each of which represents a thousand, corresponding, respectively, with the plug-holes $c$ in the resistances to which its coil is connected, and is intended to indicate yards. On the other side the scale is divided into three parts, corresponding to the plug-holes in the first resistance of the other set, and represents hundreds of degrees. The scale of the instrument I is divided on one side into ten parts, representing hundreds of yards, and on the other side into ten parts, representing tens of degrees. The instrument J is similarly divided, at one side representing tens of yards and on the other side units of degrees. The instrument K is divided on one side into ten parts, representing units of yards, and on the other side into six parts, each representing ten minutes. The scale of the instrument L is divided on one side into an indefinite number of parts indicating various kinds of information and on the other side into ten parts, each representing a minute.

The lead-wire 27 passes through a relay $r$ and connects with return-wire 28, which leads back to the transmitting-board, where it is connected with the strip $a$. The armature of the relay is grounded by wire 29, and it is adapted to make contact with either of two points $r'$, depending upon the polarity of the current flowing. These points are both connected with wire 30, leading through an alarm device $o$ to the back-stop by a key $p$. From the key a wire 31 leads to a battery $M'$, and from the battery a wire 32 leads to the wire 29. The front stop of the key connects by wire 33 with the return-wire 28.

In order that the galvanometers on the receiving-board shall give the proper indications when certain resistances are in circuit at the transmitting-station, it is necessary that the electromotive force of the battery shall be a predetermined value before an indication is transmitted.

The operation, therefore, is as follows: The switch $t$ is thrown into connection with the contacts 15 and 16. The lever $s$ is pressed against its front stop. This puts the galvanometer G into circuit with the battery M and the rheostat R, which circuit is traced as follows: from battery by wire 6 to the rheostat, by wire 19, terminal 13, switch-blade 11, contact 15, wire 21, strip $a'$, wire 10, switch-lever $s$, wire 9, galvanometer G, wire 24, wire 23, strip $a$, wire 22, contact 16, blade 12, terminal 14, wire 20, strip 7, contact 8, to battery. This will give a certain deflection to the galvanometer, depending upon the voltage of the battery. If this deflection does not indicate the working voltage, then by manipulating the rheostat R and the plug between strip 7 and the contacts 8, while still holding the switch $s$ down, the voltage can be brought to the correct amount. Having obtained this, the switch-lever $s$ is released, which allows it to resume contact with its back-stop $s'$, and the circuit of galvanometer G is opened. Having now by the aid of the range-finder and other instruments and sources obtained the range, azimuth, and other essential information, the operator places the plug $e$ into the plug-hole of the first row of resistances which corresponds to the number of thousands in the total number of yards indicating the range. For instance, if the range is three thousand five hundred and sixty-two yards, the plug $e$ is placed into the third hole of the first resistance, the plug $e'$ is placed into the fifth hole of the second resistance, plug $e^2$ is placed in the sixth hole of the third resistance, plug $e^3$ is placed in the second hole of the fourth resistance, and plug $e^4$ is placed in the proper hole of the fifth resistance, which corresponds to the special information desired to be sent. In the other set of resistances the plugs are inserted properly to transmit the degrees, minutes, and seconds of the azimuth in the same manner. After adjusting the electromotive force of the battery the switch $t$ may be left in its upper position or open, as desired; but the plugs having been inserted the switch must be in its upper closed position to transmit the range. With the switch thus set we will trace the circuit first through the galvanometer H, from battery M by wire 6, rheostat R, wire 19, terminal 13, blade 11, contact 15, wire 21, strip $a'$, through the first resistance to the third plug-hole, through the flexible conductor to the wire 1, galvanometer H, return-wire 27, relay $r$, return-wire 28, strip $a$, wire 22, contact 16, blade 12, terminal 14, wire 20, to battery. The other circuits through the first five resistances may be easily traced in the same way, since they all branch from the strip $a'$. Hence the needles of the several galvanometers will move to the left and assume positions corresponding to the value of the resistances in circuit with them, and the number of yards and information will be indicated to the observer at the receiving-station. As soon as this information is completed the relay $r$ closes the local circuit, which sounds the alarm $o$ and calls the attention of the observer to the fact that the range is indicated. As soon as the range is noted the observer closes the key $p$, which stops the ringing of the bell by opening the local circuit and at the same time creates a new circuit through the galvanometer G at the transmitting-station as follows: from battery $M'$, which is grounded, through wires 32 and 29, by wire 31, key $p$, wire 33, wire 28, strip $a$, wires 23 and 24, galvanometer G, wire 9, switch-lever $s$, back-stop $s'$, wire 26, to the ground. This will deflect galvanometer G, thus indicating to the transmitting-operator that the range has been noted. The transmitting-operator then throws the switch $t$ to the lower position, whereupon the azimuth is at once indicated at the receiving end by the needles of the several galvanometers moving over the scales to the left of the center. One of these circuits may be traced as follows, the others being easily traced: from battery M by wire 6, rheostat R, wire 19, terminal 13, blade 11, contact 17, wire 23, strip $a$, wire 28, relay $r$, wire 27, galvanometer H, wire 1 to the first flexible cord and plug in the group to the right, thence through the amount of resistance in the first of the set of resistances, thence to the strip $a^2$, wire 25, contact 18, blade 12, terminal 14, wire 20, to battery. This circuit will likewise close the local circuit and sound the alarm, which may be again opened by the observer, when the reading is noted. Thus it will be seen that the operation of sending consists in first adjusting the battery, then placing all the plugs in the proper positions and then successively throwing the main switch to its two positions. These are very simple operations and can be performed quickly and accurately with but little care.

It will be understood that the divided resistances can be more or less divided than shown and described, and that, in fact, a sliding contact adapted to move along a resistance-wire may be substituted for the plugs and holes in order to obtain finer graduation when desired.

It will be observed that in the apparatus illustrated in Fig. 1 the resistances between the strips $a$ and $a'$ and $a$ and $a^2$ are across the terminals of the battery and that the receiving-galvanometers are adapted to be connected in a shunt around more or less of the respective resistances.

In Figs. 2 and 3 I have shown modifications of my invention in which two galvanometers are placed in each circuit, one instrument being at the transmitting-station and the other at the receiving-station. In the form shown in Fig. 2 the two galvanometers are in parallel with each other, whereas in Fig. 3 they are in series with each other. The transmission of the information is accomplished by means of rheostat R', in circuit with respective pairs of galvanometers. It is obvious that the instruments of each pair will read alike for each given position of the rheostat, so that by manipulating the several rheostats to make the instrument at the transmitting-station respectively show the thousands, hundreds, tens, and units of the range the same amounts will be shown at the receiving-station. This arrangement dispenses with the battery-adjusting devices.

Having described my invention, I claim—

1. A signaling apparatus consisting of a source of electromotive force, two sets of resistances connected across the terminals of said source, each set consisting of a plurality of variable resistances, a plurality of galvanometers each of which is in a shunt around one resistance in each set of resistances, each galvanometer being adapted to indicate to the right and left of zero on its scale, means for varying the amount of said resistances between the terminals of each shunt, and a switch adapted to first close the shunts around all of one set of resistances, then to open said shunts and close the shunts around all of the other set of resistances to thereby first cause all of said galvanometers to indicate on one side of zero on their scales and then to indicate on the other side.

2. A signaling system consisting of a source of electromotive force, a galvanometer located at the transmitting-station, a switch whereby said galvanometer is normally grounded, but is adapted to be put into circuit with said source of electromotive force, resistances connected across the terminals of said source of electromotive force, a receiving-galvanometer in a shunt around said resistances, means for varying the amount of resistance between the terminals of said shunt, a relay connected in circuit with said receiving-galvanometer, a local-alarm circuit controlled by said relay and means whereby said local-alarm circuit can be opened and another circuit closed which includes the galvanometer at the transmitting-station.

In witness whereof I subscribe my signature in presence of two witnesses.

A. LE BLANC.

Witnesses:
  WALDO M. CHAPIN,
  FRANK S. OBER.